US008981946B2

(12) United States Patent
Runge et al.

(10) Patent No.: US 8,981,946 B2
(45) Date of Patent: Mar. 17, 2015

(54) SOIL MOISTURE SENSOR (71) Applicant: The Toro Company, Bloomington, MN (US)

(72) Inventors: Thomas H. Runge, Manasquan, NJ (US); Jason Lester Hill, Capistrano Beach, CA (US); James Zimmerman, Norco, CA (US)

(73) Assignee: The Toro Company, Bloomington, MN (US)

( * ) Notice: Subject to any disclaimer, the term of this patent is extended or adjusted under 35 U.S.C. 154(b) by 176 days.

(21) Appl. No.: 13/659,726

(22) Filed: Oct. 24, 2012

(65) Prior Publication Data

US 2013/0255783 A1 Oct. 3, 2013

Related U.S. Application Data (60) Provisional application No. 61/550,817, filed on Oct. 24, 2011.

(51) Int. Cl.
*G08B 21/00* (2006.01)
*A01G 25/16* (2006.01)

(52) U.S. Cl.
CPC .................................. *A01G 25/167* (2013.01)
USPC .......... 340/602; 340/601; 340/539.1; 239/63; 137/78.2; 137/78.3; 700/282; 700/284; 405/37

(58) Field of Classification Search
USPC ......... 340/602, 601, 539.1; 239/63; 137/78.2, 137/78.3; 700/282, 284; 405/37
See application file for complete search history.

(56) References Cited

U.S. PATENT DOCUMENTS

| 2,688,056 A | 8/1954 | Kettering et al. |
| 2,866,379 A | 12/1958 | Veit |
| 3,372,899 A | 3/1968 | McPherson |
| 3,639,770 A | 2/1972 | Zizelmann |
| 3,751,173 A | 8/1973 | Sanz et al. |
| 3,783,804 A | 1/1974 | Platz |
| 3,787,703 A | 1/1974 | Topol |
| 3,794,992 A | 2/1974 | Gehman |
| 3,808,385 A | 4/1974 | Klinefelter |
| 3,900,396 A | 8/1975 | Lamadrid |

(Continued)

FOREIGN PATENT DOCUMENTS

| EP | 0126031 A2 | 11/1984 |
| GB | 2247951 A | 3/1992 |

(Continued)

OTHER PUBLICATIONS

WIPO, U.S. International Search Authority, International Search Report and Written Opinion mailed Jan. 9, 2013 in International Patent Application No. PCT/US2012/061718, 9 pages.

(Continued)

*Primary Examiner* — Toan N Pham
(74) *Attorney, Agent, or Firm* — Inskeep IP Group, Inc.

(57) ABSTRACT

In one embodiment, the present invention is directed to a soil moisture sensor for interrupting an irrigation schedule of an irrigation controller. The moisture sensor comprises a relatively flat body with two lower electrodes and two lower anchoring barbs. A receiver receives moisture readings from the sensor and compares moisture data to a predetermined moisture interrupt value or limit, over which irrigation is interrupted.

21 Claims, 11 Drawing Sheets

(56) References Cited

U.S. PATENT DOCUMENTS

| | | |
|---|---|---|
| 4,064,507 A | 12/1977 | Schmitz |
| 4,176,395 A | 11/1979 | Evelyn-Veere et al. |
| 4,184,789 A | 1/1980 | Gilde, Jr. |
| 4,209,131 A | 6/1980 | Barash et al. |
| 4,264,902 A | 4/1981 | Miller |
| 4,274,705 A | 6/1981 | Miller |
| 4,306,805 A | 12/1981 | Arrington |
| 4,313,042 A | 1/1982 | Ehrhart |
| 4,396,149 A | 8/1983 | Hirsch |
| 4,405,085 A | 9/1983 | Meyer |
| 4,422,714 A | 12/1983 | Benoit et al. |
| 4,430,646 A | 2/1984 | Enemark |
| 4,445,788 A | 5/1984 | Twersky et al. |
| 4,567,563 A | 1/1986 | Hirsch |
| 4,655,076 A | 4/1987 | Weihe et al. |
| 4,674,681 A | 6/1987 | Meis et al. |
| 4,684,920 A | 8/1987 | Reiter |
| 4,693,419 A | 9/1987 | Weintraub et al. |
| 4,726,239 A | 2/1988 | Boggess et al. |
| 4,760,547 A | 7/1988 | Duxbury |
| 4,803,470 A | 2/1989 | Fineman |
| 4,814,608 A | 3/1989 | Dempsey et al. |
| 4,823,168 A | 4/1989 | Kamahori et al. |
| 4,847,781 A | 7/1989 | Brown, III et al. |
| 4,852,802 A | 8/1989 | Iggulden |
| 4,852,804 A | 8/1989 | Baier et al. |
| 4,862,701 A | 9/1989 | Small et al. |
| 4,867,379 A | 9/1989 | Hunter |
| 4,898,332 A | 2/1990 | Hunter et al. |
| 4,916,642 A | 4/1990 | Kaiser et al. |
| 4,922,433 A | 5/1990 | Mark |
| 4,937,732 A | 6/1990 | Brundisini |
| 4,940,974 A | 7/1990 | Sojka |
| 4,956,835 A | 9/1990 | Grover |
| 4,967,961 A | 11/1990 | Hunter |
| 4,974,552 A | 12/1990 | Sickafus |
| 5,005,005 A | 4/1991 | Brossia et al. |
| 5,058,806 A | 10/1991 | Rupar |
| RE33,823 E | 2/1992 | Nelson et al. |
| 5,087,886 A | 2/1992 | Mann |
| 5,101,083 A | 3/1992 | Tyler et al. |
| 5,104,045 A | 4/1992 | Kah, Jr. |
| 5,148,990 A | 9/1992 | Kah, Jr. |
| 5,150,622 A | 9/1992 | Vollweiler |
| 5,209,129 A | 5/1993 | Jaselskis et al. |
| 5,251,153 A | 10/1993 | Nielsen et al. |
| 5,299,742 A | 4/1994 | Han |
| 5,333,785 A | 8/1994 | Dodds |
| 5,355,122 A | 10/1994 | Erickson |
| 5,385,297 A | 1/1995 | Rein et al. |
| 5,408,893 A | 4/1995 | Mcleroy |
| 5,418,466 A | 5/1995 | Watson |
| 5,424,649 A | 6/1995 | Gluck et al. |
| 5,442,435 A | 8/1995 | Cooper et al. |
| 5,445,178 A | 8/1995 | Feuer |
| 5,465,904 A | 11/1995 | Vaello |
| 5,471,671 A | 11/1995 | Wang et al. |
| 5,499,024 A | 3/1996 | Germanton et al. |
| 5,526,982 A | 6/1996 | McKenzie |
| 5,598,977 A | 2/1997 | Lemme |
| 5,635,710 A | 6/1997 | Reed et al. |
| 5,667,336 A | 9/1997 | Zur |
| 5,726,644 A | 3/1998 | Jednacz et al. |
| 5,737,318 A | 4/1998 | Melnik |
| 5,740,031 A | 4/1998 | Gagnon |
| 5,740,038 A | 4/1998 | Hergert |
| 5,749,521 A | 5/1998 | Lattery |
| 5,778,332 A | 7/1998 | Chang et al. |
| 5,813,606 A | 9/1998 | Ziff |
| 5,821,864 A | 10/1998 | Knop et al. |
| 5,836,339 A | 11/1998 | Klever |
| 5,853,122 A | 12/1998 | Caprio |
| D407,656 S | 4/1999 | Klever |
| 5,898,733 A | 4/1999 | Satyanarayana |
| 5,909,429 A | 6/1999 | Satyanarayana et al. |
| 5,926,101 A | 7/1999 | Dasgupta |
| 5,978,364 A | 11/1999 | Melnik |
| 6,005,517 A | 12/1999 | Friedrichs |
| 6,016,971 A | 1/2000 | Welch |
| 6,028,857 A | 2/2000 | Poor |
| 6,061,440 A | 5/2000 | Delaney et al. |
| 6,073,427 A | 6/2000 | Nichols |
| 6,079,433 A | 6/2000 | Saarem |
| 6,088,621 A | 7/2000 | Woytowitz et al. |
| 6,097,703 A | 8/2000 | Larsen et al. |
| 6,126,093 A | 10/2000 | Grether et al. |
| 6,145,755 A | 11/2000 | Feltz |
| 6,195,108 B1 | 2/2001 | Kanno |
| 6,208,247 B1 | 3/2001 | Agre et al. |
| 6,212,388 B1 | 4/2001 | Seo |
| 6,254,828 B1 | 7/2001 | Lacount |
| 6,275,500 B1 | 8/2001 | Callaway, Jr. et al. |
| 6,283,139 B1 | 9/2001 | Symonds et al. |
| 6,298,285 B1 | 10/2001 | Addink et al. |
| 6,312,191 B1 | 11/2001 | Rosenfeld |
| 6,314,340 B1 | 11/2001 | Mecham et al. |
| 6,401,530 B1 | 6/2002 | Roman |
| 6,401,742 B1 | 6/2002 | Cramer |
| 6,452,499 B1 | 9/2002 | Runge |
| 6,453,215 B1 | 9/2002 | Lavoie |
| 6,504,834 B1 | 1/2003 | Fifield |
| 6,553,336 B1 | 4/2003 | Johnson et al. |
| 6,570,109 B2 | 5/2003 | Klinefelter et al. |
| 6,600,971 B1 | 7/2003 | Smith et al. |
| 6,601,440 B1 | 8/2003 | Chuang |
| 6,634,225 B1 | 10/2003 | Reime |
| 6,652,188 B1 | 11/2003 | Albright |
| 6,660,971 B2 | 12/2003 | Terada et al. |
| 6,665,278 B2 | 12/2003 | Grayson |
| 6,685,104 B1 | 2/2004 | Float et al. |
| 6,690,452 B2 | 2/2004 | Wilks, Jr. |
| 6,705,553 B2 | 3/2004 | Drechsel |
| 6,752,362 B1 | 6/2004 | Gretz |
| 6,768,422 B2 | 7/2004 | Schofield et al. |
| 6,782,310 B2 | 8/2004 | Bailey et al. |
| 6,784,988 B2 | 8/2004 | Vijayakumar et al. |
| 6,842,430 B1 | 1/2005 | Melnik |
| 6,855,947 B2 | 2/2005 | Graves et al. |
| 6,892,114 B1 | 5/2005 | Addink et al. |
| 6,895,987 B2 | 5/2005 | Addink et al. |
| 6,907,787 B2 | 6/2005 | Cook et al. |
| 6,947,132 B1 | 9/2005 | Boss et al. |
| 6,977,351 B1 | 12/2005 | Woytowitz |
| 6,997,642 B2 | 2/2006 | Bishop, Jr. |
| 7,012,394 B2 | 3/2006 | Moore et al. |
| 7,032,836 B2 | 4/2006 | Sesser et al. |
| 7,037,554 B2 | 5/2006 | Tao et al. |
| 7,058,040 B2 | 6/2006 | Schmidt |
| 7,063,270 B2 * | 6/2006 | Bowers et al. ............... 239/1 |
| 7,086,608 B2 | 8/2006 | Perkins |
| 7,100,842 B2 | 9/2006 | Meyer et al. |
| 7,114,376 B2 | 10/2006 | Loucks |
| 7,143,957 B2 | 12/2006 | Nelson |
| 7,159,795 B2 | 1/2007 | Sesser et al. |
| 7,172,366 B1 | 2/2007 | Bishop, Jr. |
| 7,189,960 B2 | 3/2007 | Zimmerman |
| 7,191,955 B2 | 3/2007 | Ivans |
| 7,240,743 B2 | 7/2007 | Buss et al. |
| 7,247,837 B2 | 7/2007 | Zimmerman |
| 7,261,245 B2 | 8/2007 | Zur |
| 7,264,177 B2 | 9/2007 | Buck et al. |
| 7,281,439 B2 | 10/2007 | Schmitt et al. |
| 7,286,935 B2 | 10/2007 | Aspola et al. |
| 7,339,957 B2 | 3/2008 | Hitt |
| 7,413,380 B2 | 8/2008 | Corwon et al. |
| 7,719,432 B1 | 5/2010 | Hill |
| 7,788,970 B2 * | 9/2010 | Hitt et al. ............... 73/73 |
| 7,789,321 B2 | 9/2010 | Hitt |
| 8,302,881 B1 * | 11/2012 | Campbell et al. ............... 239/11 |
| 8,660,705 B2 * | 2/2014 | Woytowitz et al. ............... 700/284 |
| 2001/0033559 A1 | 10/2001 | Masui |
| 2001/0049563 A1 | 12/2001 | Addink et al. |
| 2002/0002425 A1 | 1/2002 | Dossey |
| 2002/0029111 A1 | 3/2002 | Peek |

(56) References Cited

U.S. PATENT DOCUMENTS

| | | |
|---|---|---|
| 2002/0100814 A1 | 8/2002 | Pollak |
| 2002/0112531 A1 | 8/2002 | Hubbell |
| 2002/0123351 A1 | 9/2002 | Miyoshi et al. |
| 2002/0139868 A1 | 10/2002 | Sesser et al. |
| 2002/0144453 A1 | 10/2002 | Su |
| 2003/0037167 A1 | 2/2003 | Garcia-Luna-Aceves et al. |
| 2003/0067889 A1 | 4/2003 | Petite |
| 2003/0092442 A1 | 5/2003 | Dalal |
| 2003/0114204 A1 | 6/2003 | Allen et al. |
| 2004/0030456 A1 | 2/2004 | Barlow |
| 2004/0039489 A1 | 2/2004 | Moore |
| 2004/0071125 A1 | 4/2004 | Gross |
| 2004/0083833 A1 | 5/2004 | Hitt et al. |
| 2004/0100394 A1 | 5/2004 | Hitt |
| 2005/0079831 A1 | 4/2005 | Ramachandran |
| 2006/0054214 A1 | 3/2006 | Caamano |
| 2006/0127183 A1 | 6/2006 | Bishop, Jr. |
| 2006/0178847 A1 | 8/2006 | Glancy |
| 2007/0237583 A1 | 10/2007 | Corwon |
| 2008/0129495 A1 | 6/2008 | Hitt |
| 2008/0255708 A1 | 10/2008 | Nies et al. |
| 2009/0177330 A1* | 7/2009 | Kah, Jr. .................. 700/284 |
| 2010/0268392 A1 | 10/2010 | Korol et al. |

FOREIGN PATENT DOCUMENTS

| | | |
|---|---|---|
| JP | S63294145 A | 11/1988 |
| JP | 2002168674 A | 10/2010 |
| WO | WO2006001734 A1 | 1/2006 |

OTHER PUBLICATIONS

United States Patent and Trademark Office, Office Action mailed Jun. 30, 2011 in U.S. Appl. No. 11/207,220, 17 pages.
United States Patent and Trademark Office, Final Office Action mailed May 5, 2011 in U.S. Appl. No. 12/186,454, 12 pages.
United States Patent and Trademark Office, Office Action mailed Apr. 13, 2011 in U.S. Appl. No. 12/634,554, 9 pages.
United States Patent and Trademark Office, Notice of Allowance mailed Mar. 2, 2011 in U.S. Appl. No. 12/855,615, 10 pages.
United States Patent and Trademark Office, Office Action mailed Nov. 17, 2010 in U.S. Appl. No. 12/855,615, 13 pages.
United States Patent and Trademark Office, Notice of Allowance mailed Jun. 30, 2010 in U.S. Appl. No. 11/220,289, 4 pages.
United States Patent and Trademark Office, Notice of Allowance mailed May 28, 2010 in U.S. Appl. No. 10/693,017, 14 pages.
United States Patent and Trademark Office, Final Office Action mailed Apr. 28, 2010 in U.S. Appl. No. 12/186,454, 9 pages.
United States Patent and Trademark Office, Final Office Action mailed Feb. 23, 2010 in U.S. Appl. No. 10/693,017, 9 pages.
United States Patent and Trademark Office, Notice of Allowance mailed Feb. 11, 2010 in U.S. Appl. No. 12/104,937, 11 pages.
United Ststes Patent and Trademark Office, Office Action mailed Jan. 12, 2010 in U.S. Appl. No. 11/220,289, 7 pages.
United States Patent and Trademark Office, Office Action mailed Jan. 30, 2009 in U.S. Appl. No. 11/220,289, 7 pages.
United States Patent and Trademark Office, Office Action mailed May 12, 2009 in U.S. Appl. No. 10/693,017, 8 pages.
United States Patent and Trademark Office, Final Office Action mailed Dec. 9, 2008 in U.S. Appl. No. 11/220,289, 9 pages.
United States Patent and Trademark Office, Final Office Action mailed Nov. 25, 2008 in U.S. Appl. No. 10/693,017, 10 pages.
United States Patent and Trademark Office, Office Action mailed May 7, 2008 in U.S. Appl. No. 10/693,017, 10 pages.
United States Patent and Trademark Office, Office Action mailed Jan. 24, 2008 in U.S. Appl. No. 11/220,289, 6 pages.
United States Patent and Trademark Office, Final Office Action mailed Oct. 24, 2007 in U.S. Appl. No. 10/693,017, 6 pages.
United States Patent and Trademark Office, Notice of Allowance mailed Oct. 16, 2007 in U.S. Appl. No. 10/692,518, 8 pages.
United States Patent and Trademark Office, Office Action mailed May 9, 2007 in U.S. Appl. No. 10/692,518, 8 pages.
Culler, David et al., "Overview of Sensor Networks", IEEE Computer, Special Issue in Sensor Networks, Aug. 2004, pp. 41-49.
United States Patent and Trademark Office, Office Action mailed Apr. 13, 2004 in U.S. Appl. No. 10/693,017, 9 pages.
Chakeres, Ian D. et al., "AODV Routing Protocol Implementation Design", Proceedings of the International Workshop on Wireless Ad Hoc Networking (WWAN), Tokyo, Japan, Mar. 2004.
Hill, Jason Lester, "System Architecture for Wireless Sensor Networks", PhD Thesis published at the University of California at Berkeley, 2003, pp. 1-186.
Dukes et al., Residential Irrigation System Rainfall Shutoff Devices, University of Florida IFAS Extension, 7 pages, Aug. 2002.
IEEE, "Wireless Medium Access Control (MAC) and Physical Layer (PHY) Specifications for Wireless Personal Area Networks (WPANS)," IEEE Std 802.15.1(TM)-2002, 2002, 9 pages, IEEE.
Gutierrez et al., "IEEE 802.15.4: Developing Standard for Low-Power Low-Cost Wireless Personal Area Networks", IEEE Network, Sep. 1, 2001, 8 pages, IEEE.
E-mail of Feb. 27, 2001 from Alicia Rodriguez, Product Manager for Rain Bird's Clemar manufacturing Corp., 2nd largest manufacturer of irrigation products, and rain sensors in the world.
E-mail of Feb. 14, 2001 from Steve Tyler, Buckner, Inc., who is also Patentee of U.S. 5,101,083.
E-mail of Feb. 13, 2001 from Darren Redatzke, Sr., Marketing Manager for Toro, Inc., world's largest manufacturer of irrigation products and rain sensors.
E-mail of Feb. 6, 2001 from "Wally", Managing Director of Holman Industries, the largest manufacturer or irrigation controllers in Australia.
Advertising copy from archive.org for "R&D Engineering Wireless Rain Sensor Products" by R&D Engineering, copyright 2000, rainsensor.com, 2 pages
Trenholm et al., How to Calibrate Your Sprinkler System1, University of Florida IFAS Extension, 4 pages, Jan. 2001.
Hill, Jason et al., "System Architecture Directions for Networked Sensors", ASPLOX-IX, Cambridge, Massachusetts, Nov. 2000.
"Presenting the Wireless RainSensor for irrigation systems" brochure by R&D Engineering, copyright 2000, rainsensor.com, 5 pages.
"The Wireless RainSensor for Irrigation Systems" brochure by R&D Engineering, copyright 2000, rainsensor.com, 8 pages.
Maltz, David A., et al., "Experiences Designing and Building a Multi-Hop Wireless Ad Hoc Network Testbed," Mar. 5, 1999, 22 pages, School of Computer Science, Carnegie Mellon University, Pittsburgh, Pennsylvania.
Garcia-Luna-Aceves, J.J. et al., "Wireless Internet Gateways (WINGS)," 1997, 7 pages, University of California at Santa Cruz, Department of Computer Engineering, Santa Cruz, California.
"Application of Fuzzy Logic in an Irrigation Control System"—Zhang et al, Auburn University, IEEE 1996.
Rain Bird, Maxicom Guide to Operations, Chapter 7, Oct. 1994, US.
Rain Bird, Maxicom Central Systems, Irrigation Management Designed to Fit Your Needs Jun. 1994, pp. 2-8, Rain Bird Sales, Inc., US.
Rain Bird, Components of the Maxicom System, Feb. 9, 1994, p. 3.2, Section 3,US.
Rain Bird, Any Time Any Where Any Controller, Central Output Module, 1994, Rain Sales, Inc., 4 pages.
Rain Bird, Maxicom Central Computer Control Sstem, "Landscape Irrigation Products, 1993-1994 Catalog," pp. 98-99, US.
Brownrigg, E., "User Provided Access to the Internet," Nov. 30-Dec. 2, 1992, Proceedings of The Fifth International Conference on New Information Technology, Hong Kong.
Daly, J., Ed., "Distribution, Networks, and Networking: Options for Dissemination," Jun. 9-10, 1992, 7 pages, Workshop on Electronic Texts-Session III Proceedings, Library of Congress, Washington, D.C.
"An Automated Data Acquisition System for Modeling the Characteristics of a Soil Moisture Sensor"—Posada et al, IEEE, vol. 40, No. 5, Oct. 1991.

(56) References Cited

OTHER PUBLICATIONS

Shacham, N., et al., "A Packet Radio Network for Library Automation," Oct. 19-22, 1987, pp. 456-462, Proceedings of the 1987 IEEE Military Communcations Conference. (MILCOM '87), New York: IEEE Press vol. 2.

Lynch, Clifford A. et al., Packet Radio Networks, 1987, 276 pages, University of California, Berkeley, California.

Jubin, John, et al., The DARPA Packet Radio Network Protocols, Jan. 1987, pp. 21-34, Proceedings of the IEEE, vol. 75, No. 1.

Westcott, J.A., "Issue in Distribution Routing for Mobile Packet Radio Networks," 1982, pp. 233-238, IEEE.

Kahn, R.E., "The Organization of Computer Resources into a Packet Radio Network," Jan. 1977, pp. 169-178, IEEE Transactions on Communications, vol. 25, No. 1.

\* cited by examiner

SOIL MOISTURE SENSOR

RELATED APPLICATIONS

This application claims priority to U.S. Provisional Application Ser. No. 61/550,817 filed Oct. 24, 2011 entitled Soil Moisture Sensor, which is hereby incorporated herein by reference in its entirety.

BACKGROUND OF THE INVENTION

Most common types of environmental monitoring and control for irrigation systems incorporate a means of controlling the start time and duration of watering cycles via a central timing controller. The need to adjust a watering cycle due to the environmental influence is necessary in order to save natural resources, reduce costs, and to improve the growing environment for plants. Such environmental conditions include temperature changes, relative humidity, precipitation, wind and cloud cover.

In conventional control system, the primary means for halting an automatic watering cycle when certain environmental event occurs is by an operator manually suspending the cycle at the irrigation controller. In most situations this proves to be an ineffective means of conserving resources due to the inconsistent and inefficient methods followed by the operator. In fact, quite often the operator ignores the need to suspend the watering cycle altogether, and in some cases neglects to resume the watering cycle when required, leading to both over-watered and under-watered landscaping.

It is because of this unreliable and inconvenient manual method that environmental sensors were developed that allow for an automatic interruption of the controller due to an environmental condition. One of the major drawbacks of the conventional environmental sensors is the extensive installation time and difficult methods required for a proper installation.

A soil moisture sensor is usually installed in the ground by boring of a precisely sized hole, placing the sensor at the appropriate depth to measure the soil properties in the root zone, placing a slurry of water and soil in the hole to assure that the sensor has good contact with the soil and try to restore the soil in the hole to its previous condition as much as possible so that the sensor provides readings that correctly reflect the state of the soil. If the soil is not restored properly, water and fertilizer can drain down along the hole to the sensor and corrupt the sensor readings.

It is common for soil to be stratified into regions of varying textures, composition and drainage properties. Digging a hole and refilling it with slurry disrupts these strata around the sensor and decreases the accuracy of the sensor readings.

As the soil cycles from wet to dry, the soil may shrink back from the sensor and loose contact. If this happens, the sensor can no longer read the soil status properly. Sometimes, rewetting the soil is not sufficient to restore the sensor contact and the sensor must be reinstalled.

The wires that run from the sensors up through the soil to the surface are then routed either to a central controller directly or to a central controller through a wireless transmission system. This method is burdensome in time, tools required and is prone to unsuccessful installation through poor seating of the sensor in the soil, poor representation of the target soil by the sensed soil that was disturbed by installation, and electrical noise in connecting wires. The central controller receives the signals from the remote sensors and determines whether or not to start the next irrigation cycle for a particular irrigation zone.

SUMMARY OF THE INVENTION

In one embodiment, the present invention is directed to a soil moisture sensor for interrupting an irrigation schedule of an irrigation controller. The moisture sensor comprises a relatively flat body with two lower electrodes and two lower anchoring barbs. A receiver receives moisture readings from the sensor and compares moisture data to predetermined moisture interrupt value or limit, over which irrigation is interrupted.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Figure 8:
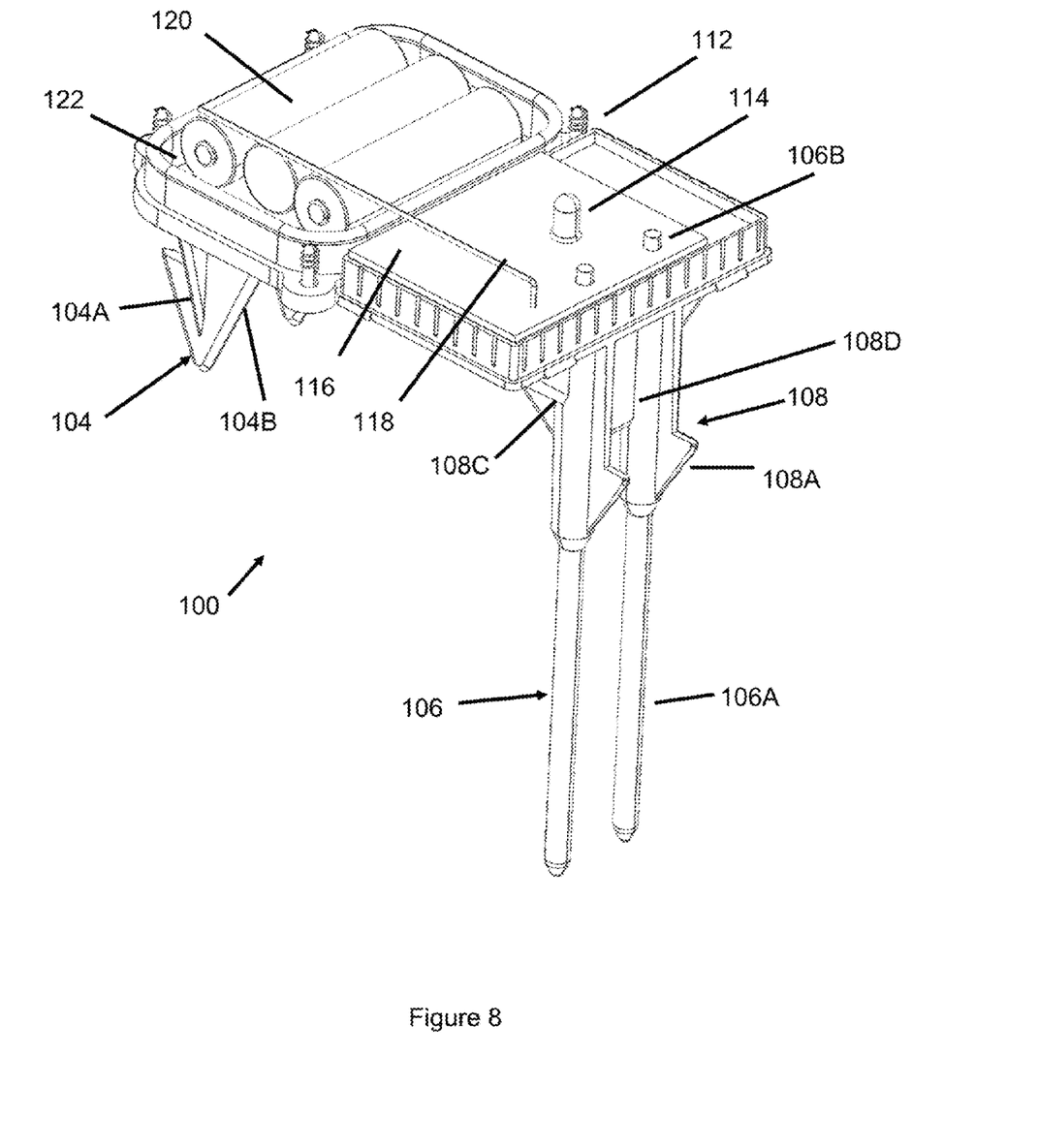
FIG. 8 illustrates a top view of the sensor of FIG. 1 without a top housing portion.
Figure 9:
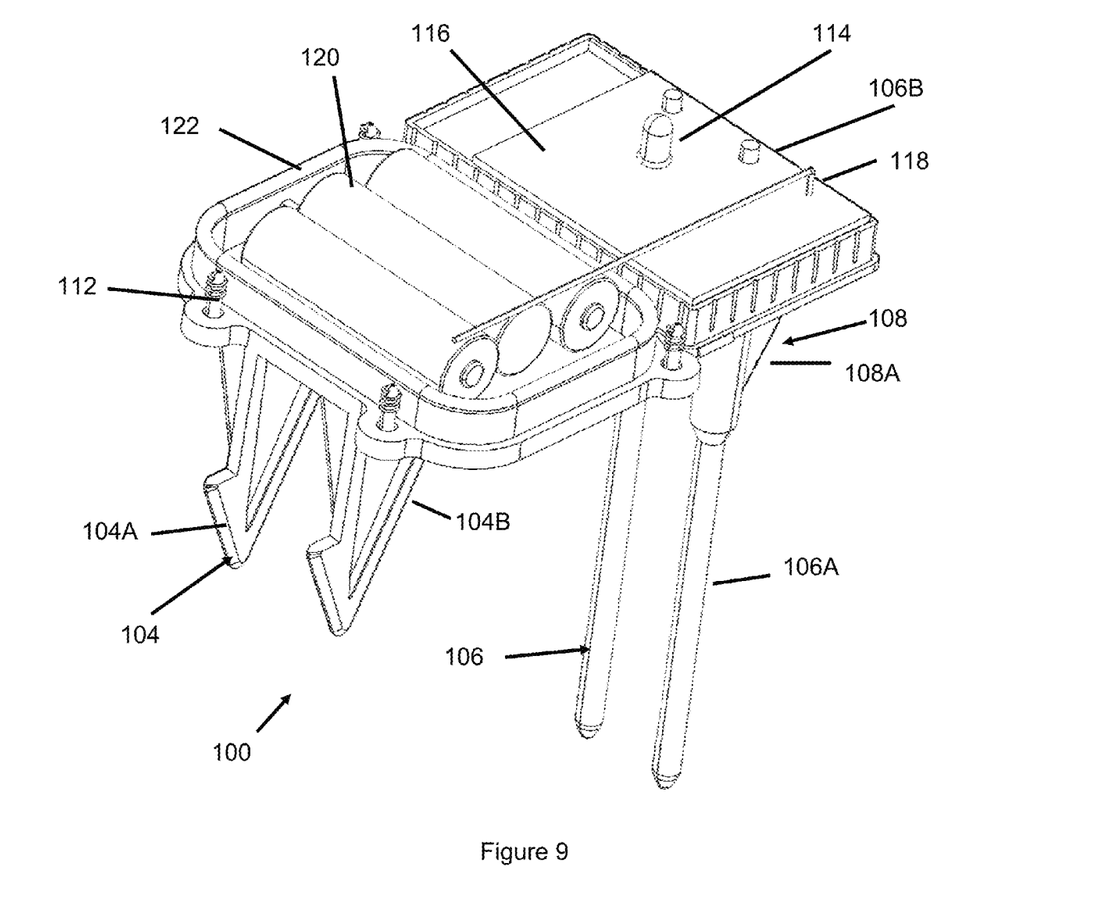
FIG. 9 illustrates a top view of the sensor of FIG. 1 without a top housing portion.
Figure 10:
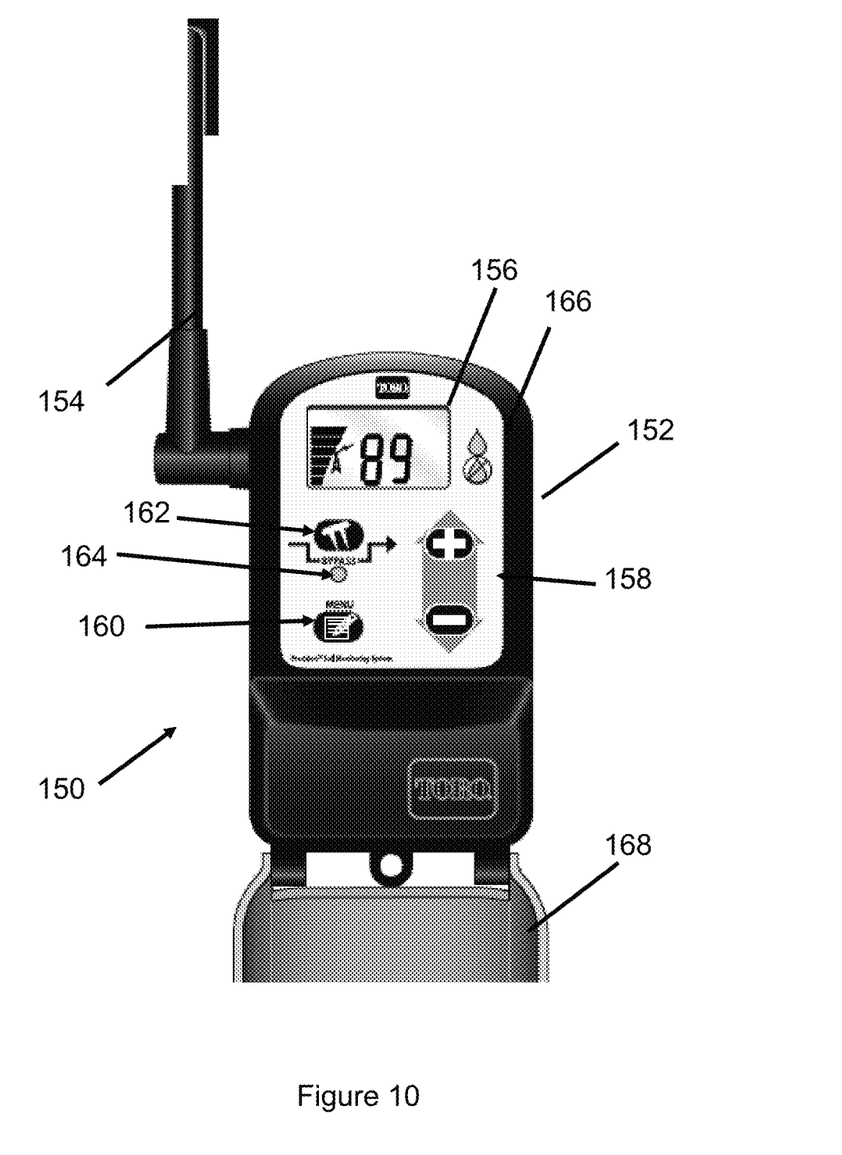
FIG. 10 illustrates a front view of a receiver according to an embodiment of the present invention.

FIGS. 1-9 illustrate various views of a wireless soil moisture sensor 100 that communicates with a receiver unit 150, shown in FIG. 10 (also referred to as a soil moisture sensor interface). The moisture sensor 100 measures soil moisture, salinity, and temperature values of a region of soil at its ground location and periodically transmits these values to the receiver unit 150. When the measured moisture value rises above a predetermined interrupt value or the measured value of temperature falls below a predetermined value or threshold, the receiver unit 150 interrupts irrigation controlled by an irrigation controller (to which the receiver unit 150 is connected). When the measured moisture value falls below a second predetermined value, a visual alert can be generated by the receiver 150 to alert the user to dry turf conditions. In this respect, the sensor 100 and receiver unit 150 can regulate irrigation based on soil measurements such as a moisture level. For example, if the current moisture value of the soil remains below the interruption threshold for more than three days or the current moisture value drops below 50% of the interruption threshold, an audio and/or visual alert on the receiver 150 is activated.

As best seen in FIGS. 1-4, the moisture sensor 100 includes a top housing portion 102 that is located on the "top" of the sensor 100 and is generally exposed from the nearby turf after installation. While the housing portion 102 is illustrated with a generally rectangular shape, square, circular, or any other shape configurations are also possible.

As best seen in FIGS. 1 and 3-7, the sensor 100 includes two electrodes 106 and two anchoring members or stakes 104 that protrude from the underside of the sensor 100 (i.e., the side opposite of the top housing portion 102). The electrodes 106 are preferably comprised of a conductive material, such as metal, on their exposed surface 106A.

The electrodes 106 further comprise an upper support portion 108 that encloses an upper length of the conductive portion 106A. The support portion 108 includes two barbed front fins 108A, two side fins 108C, a middle fin 108D, and two back fins 108B which support and anchor the electrodes 106 into soil. Preferably, the back fins 108B and the side fins 108C are angled relative to the surfaces of the underside of the sensor 100 and have relatively sharp or angled edges to enhance penetrating into soil.

The two back stakes 104 each include two angled side fins 104C, two angled front fins 104B and two barbed back fins 104A. Again, these fins preferably have a relatively sharp or angled edge to enhance penetrating into soil. Since the body of the sensor 100 has a generally flat shape, the electrodes 106 help anchor the front of the sensor 100 while the back stakes 104 help anchor the back. In this respect, the sensor 100 can maintain a relatively low profile in the turf to minimize damage from ground keeping equipment and reduce tripping or other type of injuries to pedestrians.

Figure 5:
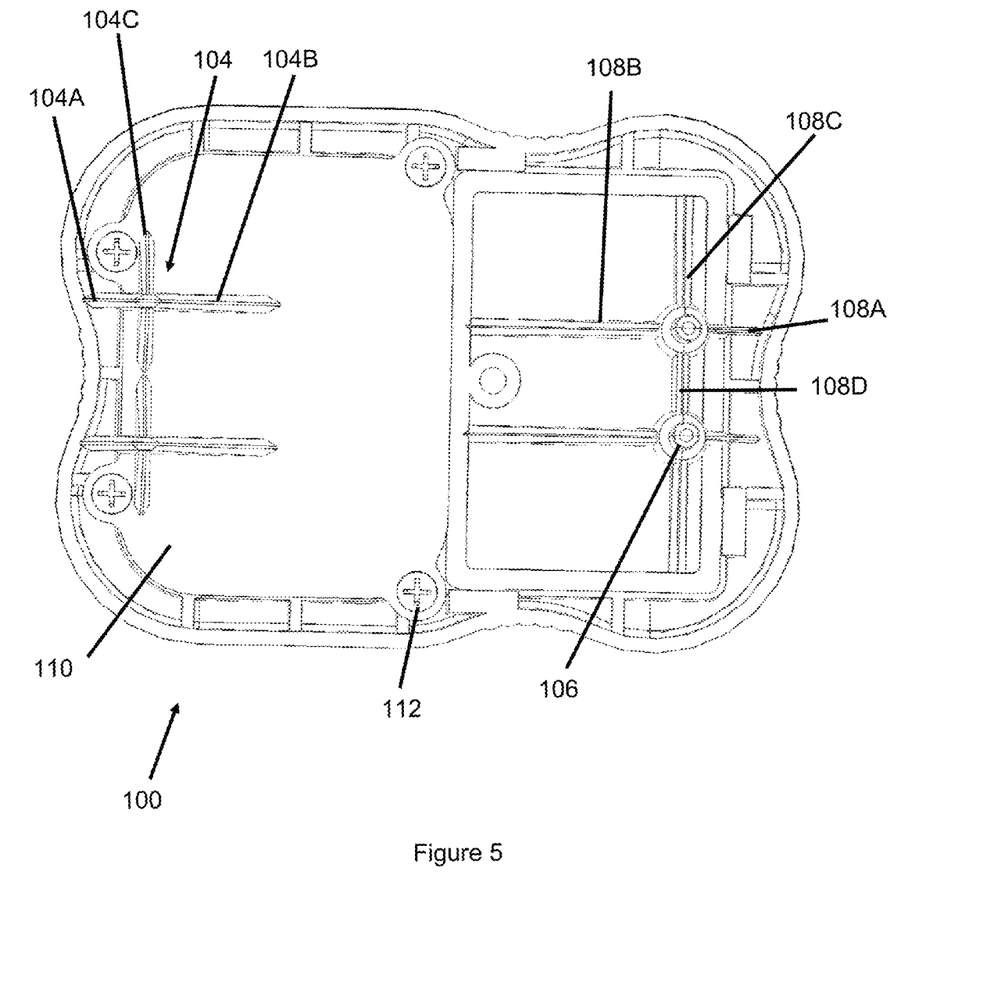
FIG. 5 illustrates a bottom view of the sensor of FIG. 1.
Figure 6:
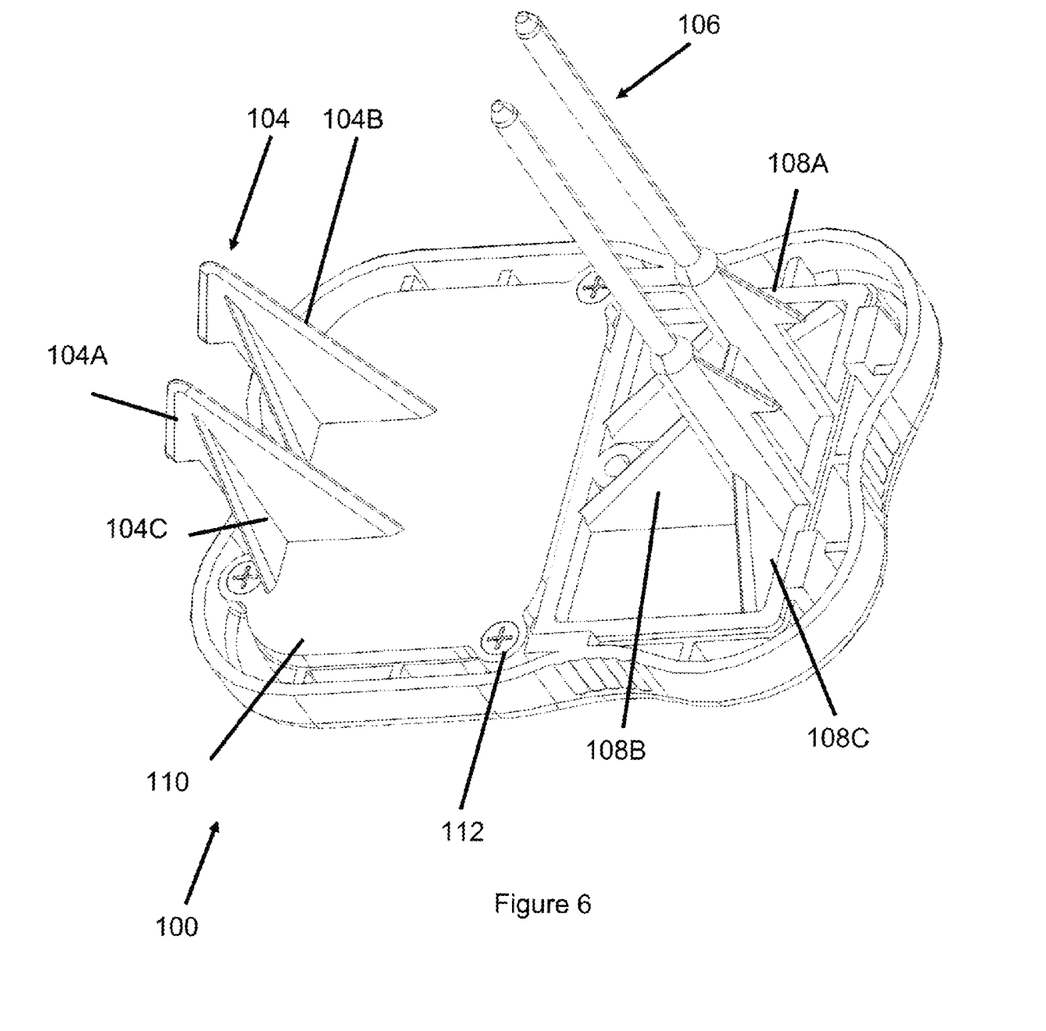
FIG. 6 illustrates a perspective bottom view of the sensor of FIG. 1.
Figure 7:
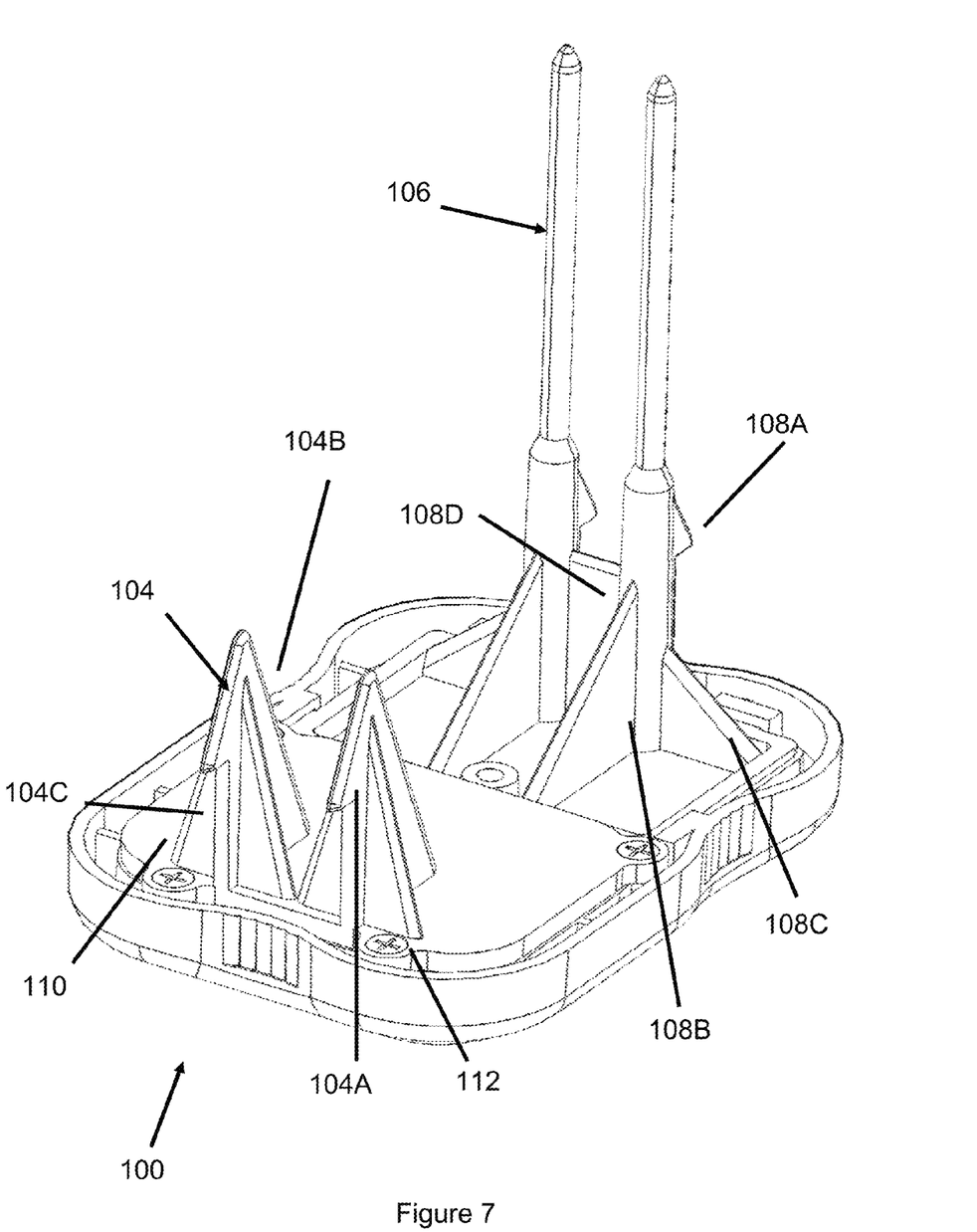
FIG. 7 illustrates another perspective bottom view of the sensor of FIG. 1.

As best seen in FIG. 5-7, the back stakes 104 are located on a removable bottom plate 110 that is fastened via several screws 112. Removal of this plate 110 allows a user to access a battery compartment.

FIGS. 8 and 9 illustrate two perspective views of the sensor 100 without its top housing portion 102. The interior of the sensor 100 includes a battery compartment containing batteries 120 and sealed with o-ring 122. Adjacent to the battery compartment is a PCB compartment that contains a printed circuit board 116 including a microcontroller, memory, transmitter, sensor chips, status L.E.D. 114, and antenna 118.

Top portions 106B of the electrodes 106 extend through the circuit board 116, thereby allowing the sensor measurement circuits to connect to and make measurements. The antenna 118 also connects upward from the circuit board 116 and then bends at about a 90 degree angle such that much of the antenna 116 extends in a parallel orientation relative to the sensor's length. In other words, the antenna 118 is positioned horizontally over much of the circuit board 116 and the batteries 120. Preferably, the antenna 118 is composed of a conductive material and therefore allows the circuit board 116 to transmit and receive wireless signals via the antenna.

The L.E.D. 114 is preferably capable of illuminating in multiple colors and is positioned such that it is exposed through the top housing portion 102 (e.g., through a sealed aperture or a small window). In this regard, the sensor 100 can communicate basic signals to a user by illuminating the L.E.D. 114, changing its color or blinking in a pattern.

Turning to FIG. 10, the receiver 150 includes a body 152 having a user interface, an antenna 154 for transmitting with the sensor 100, and a pivoting cover 168 for protecting the user interface from damage. Preferably, the user interface includes an LCD display 156 that can display a number of menus, data, status messages, and other similar information. The LCD display 156 is preferably manipulated by a user by the menu button 160 and plus/minus buttons 158.

A bypass button 162 allows a user to halt the irrigation interruption activity of the receiver 150 and preferably illuminates an indicator light 164 when in its bypass mode. An interruption indicator 166 preferably include one or more indicator lights for indicating when the irrigation schedule is being interrupted (e.g., a red light) or allowed to water (e.g., a green light).

The receiver 150 includes an irrigation interruption mechanism that preferably connects to a sensor port on an irrigation controller or is connected in series to the "common wire" of an irrigation system. In either connection scenario, the irrigation interruption mechanism of the receiver 150 can cause an interruption of scheduled irrigation. In another embodiment, the irrigation interruption mechanism and receiver 150 can be added to a controller via a removable module or can be non-removably integrated into the controller itself.

Figure 11:
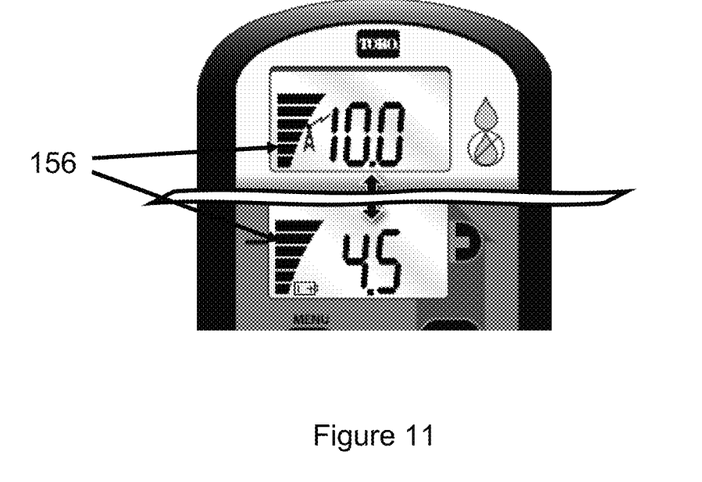
FIG. 11 illustrates a view of an interface of the receiver of FIG. 10.

Once a receiver 150 and a sensor 100 initially wirelessly "pair" together, the display 156 alternates between a signal reception strength display (the top portion of FIG. 11) and a battery strength display (bottom portion of FIG. 11). The signal reception display preferably includes a plurality of bars representing a percentage strength of the signal reception and a numeric value of the signal strength to the sensor 100. Similarly, the battery strength display includes a plurality of bars representing a percentage strength of the battery and a numeric battery volt value of the battery in the sensor 100.

Once the receiver 150 and the sensor 100 have been paired, the user can install the sensor into the turf. To assist the user in finding an installation location with desirable wireless signal strength between the sensor 100 and receiver 150, the two devices can enter a wireless placement mode in which the L.E.D. 114 changes colors to represent the existing signal strength. For example, when the L.E.D. 114 illuminates green, the signal strength is strong/excellent, if the L.E.D. 114 illuminates yellow, the signal strength is medium/marginal, if the L.E.D. 114 illuminates red, the signal strength is very weak and if the L.E.D. 114 illuminates a flashing red light, no signal is detected by the sensor 100. In this respect, the user can walk freely around the turf while being aware of the general quality of the signal strength between the sensor 100 and the receiver 150.

Figure 1:
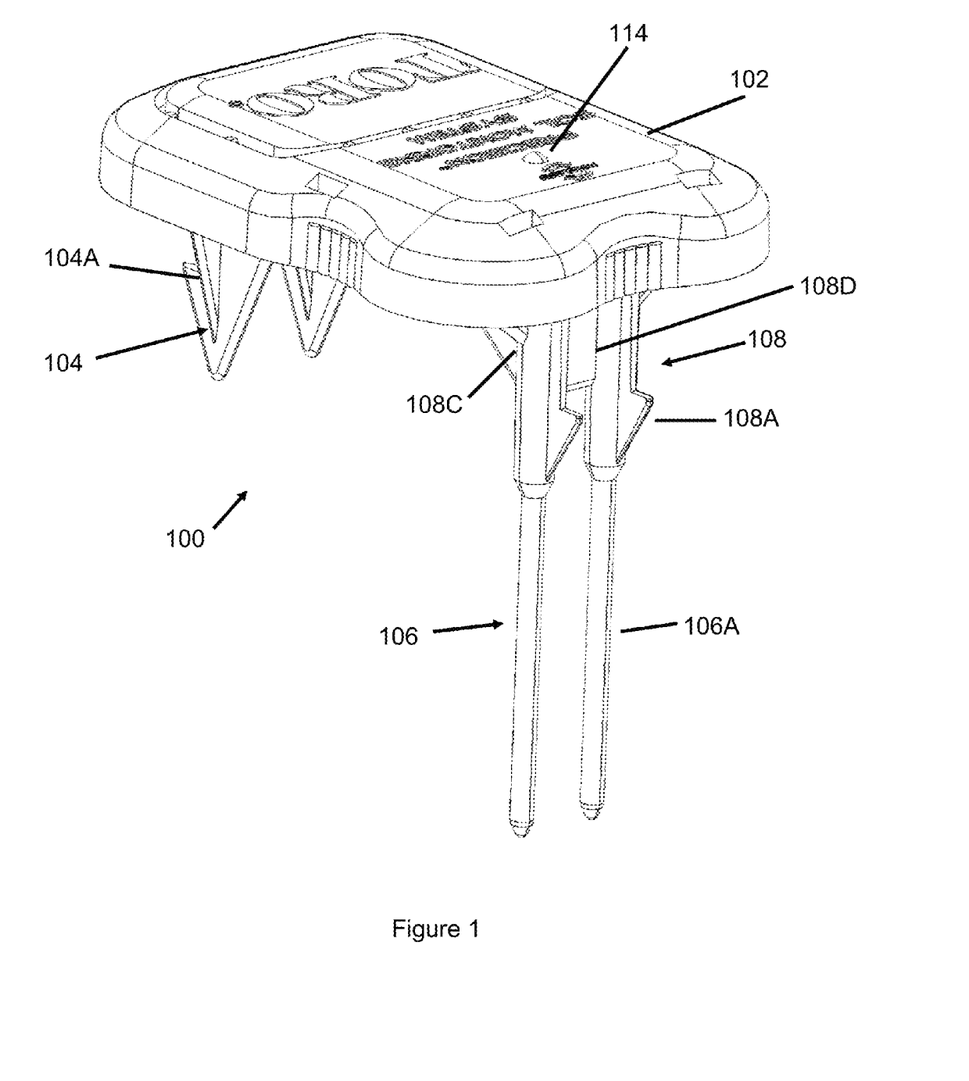
FIG. 1 illustrates a perspective view of a moisture sensor according to an embodiment of the present invention.
Figure 2:
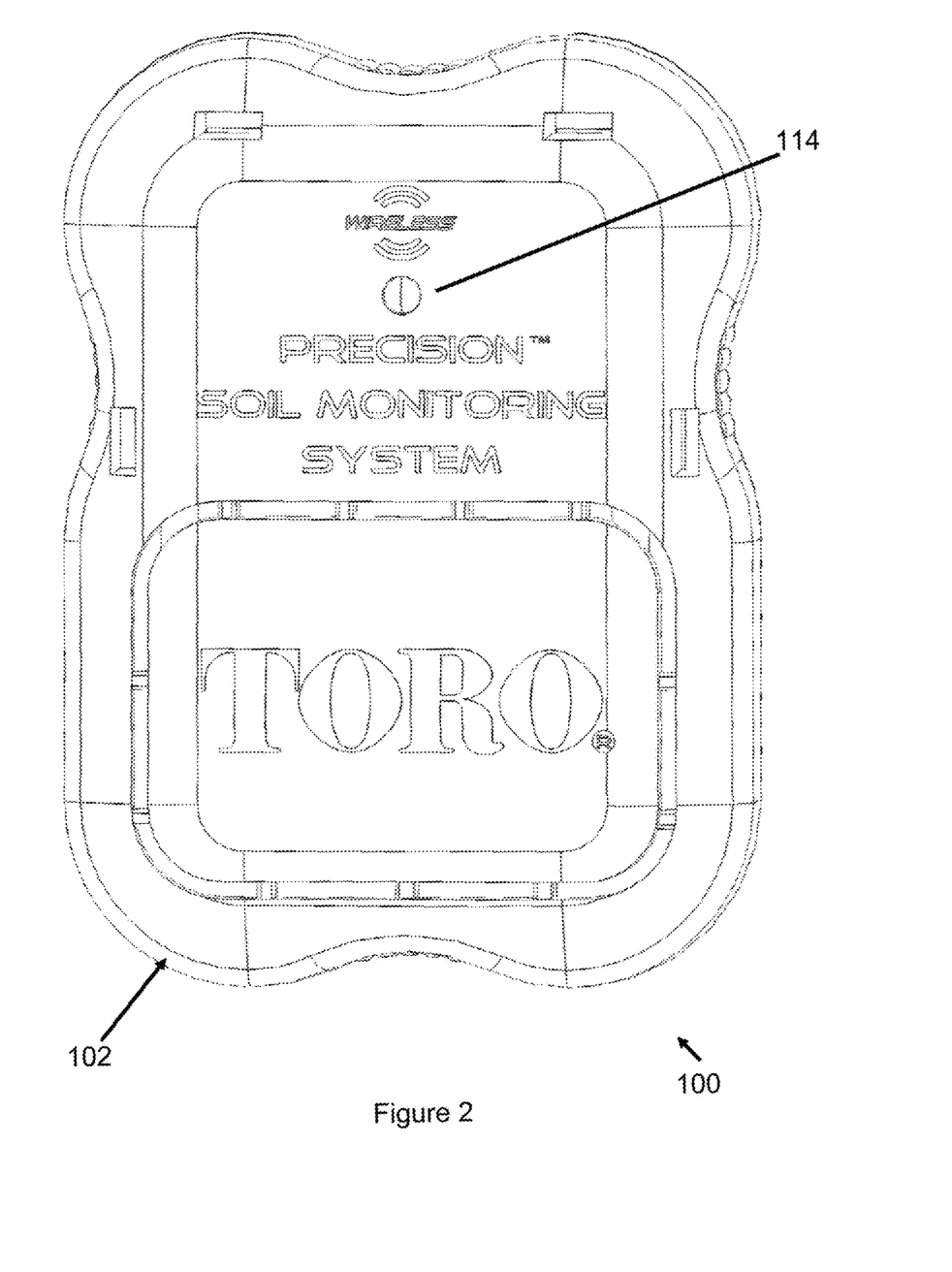
FIG. 2 illustrates a top view of the sensor of FIG. 1.
Figure 3:
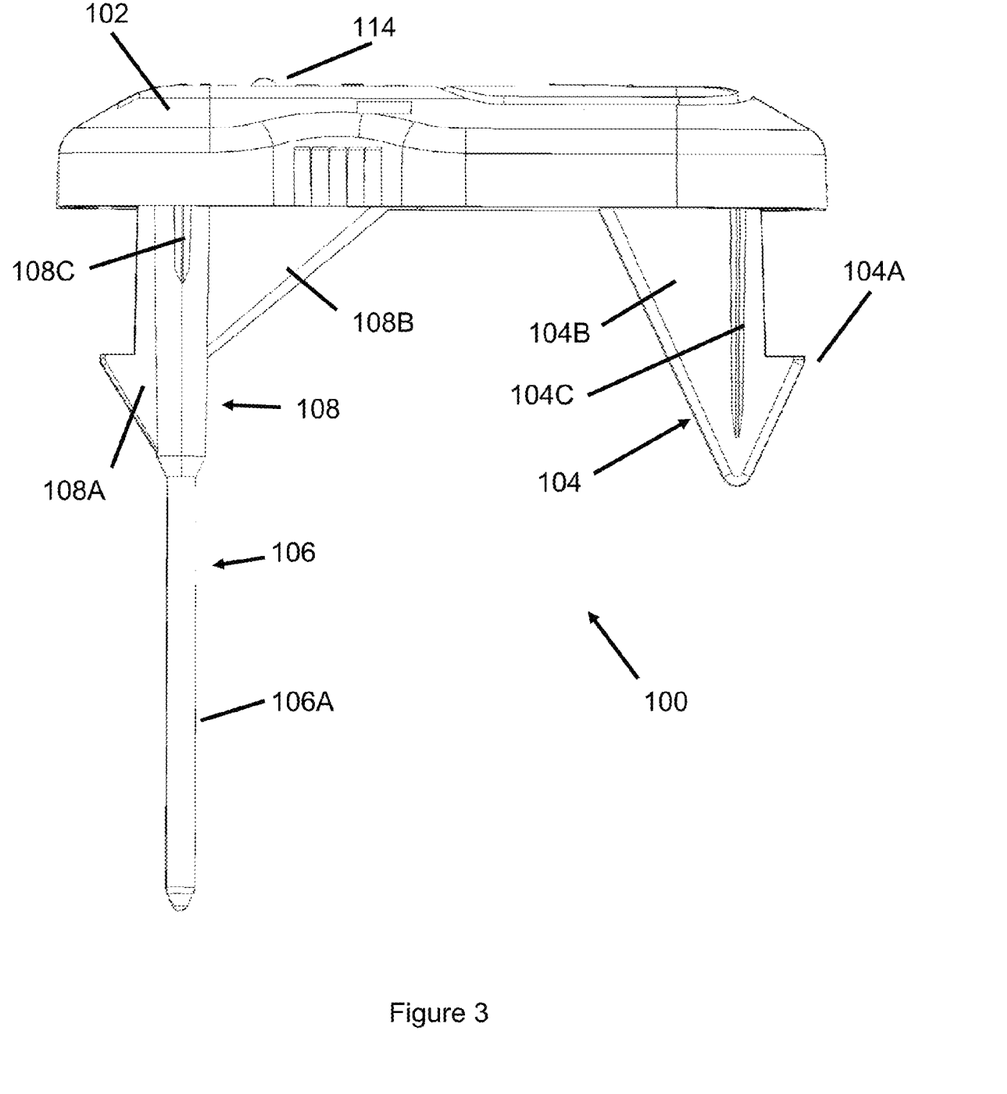
FIG. 3 illustrates a side view of the sensor of FIG. 1.
Figure 4:
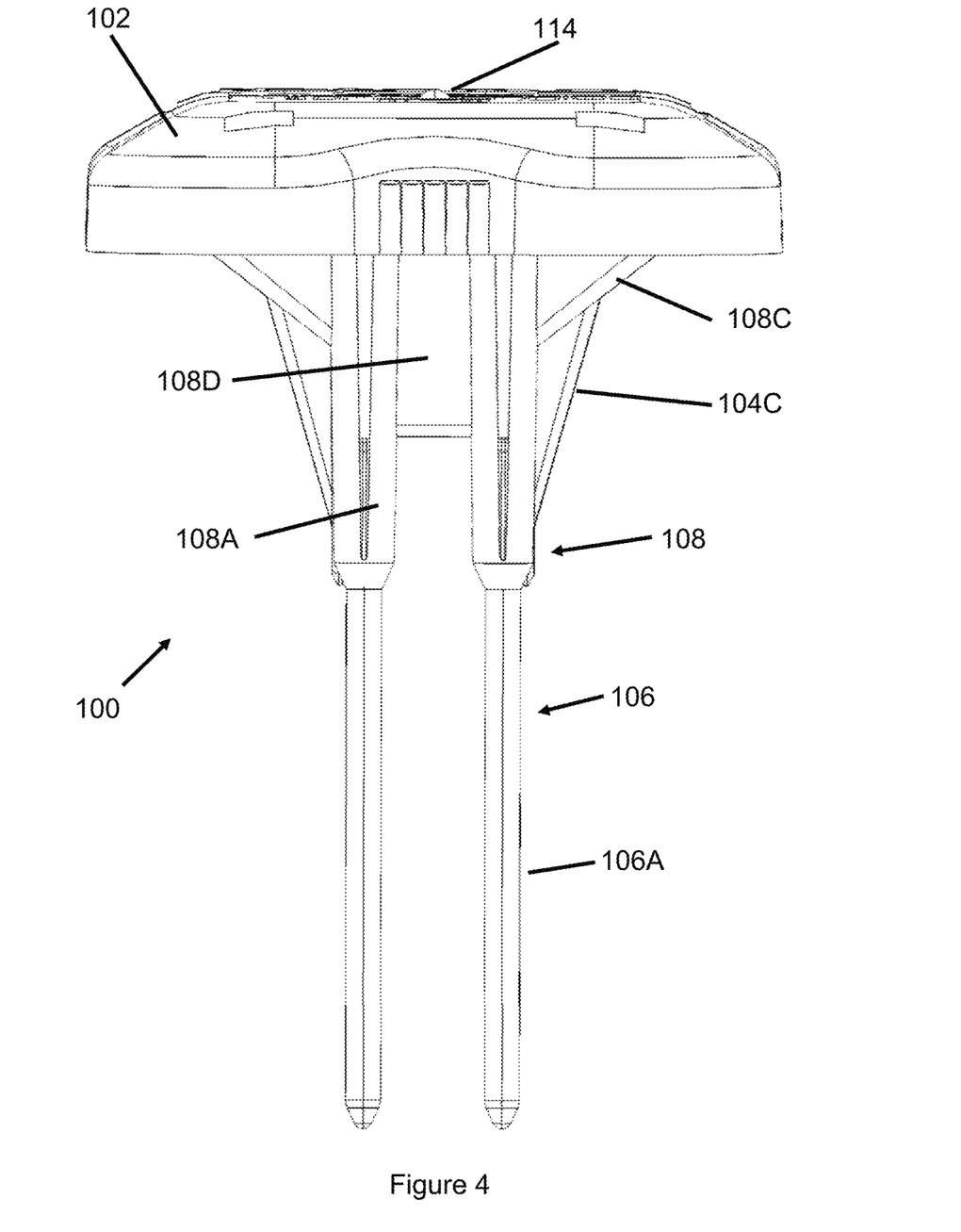
FIG. 4 illustrates a front view of the sensor of FIG. 1.

The sensor 100 is preferably installed into a desired area of turf by applying equal pressure on the top of the top housing portion 102 until both the electrodes 106 and back stakes 104 are fully inserted into the soil.

The sensor 100 and receiver 150 can also calibrate themselves to the condition of the surrounding turf with a programmed calibration mode or software routine. More specifically, the maximum soil moisture content, or field capacity, can be determined by thoroughly soaking an area of at least 6 feet around the sensor 100. The sensor 100 periodically measures the decrease in the water level over a predetermined period of time, such as 24 hours, and thereby determines the maximum soil moisture content. In one embodiment, the sensor 100 monitors for a peak soil moisture level within 24 hours of its first power on by a user and uses this value as a maximum soil moisture content. In another embodiment, the soil moisture sensor determines maximum soil moisture content of the soil moisture value at about six hours after the peak soil moisture value measured by the soil sensor 100.

During normal operation, the sensor 100 periodically transmits moisture measurement data and temperature measurement data (and optionally salinity data), to the receiver 150. The receiver compares the current moisture reading to a predetermined interrupt value (i.e., a limit or threshold value) and interrupts irrigation if the predetermined value is exceeded. Preferably, the predetermined value is a percentage of the maximum soil moisture content of the soil (e.g., field capacity); however, a variety of different predetermined value types can be used. For example, if the current moisture value is greater than or equal to 75% of the maximum soil moisture capacity, the receiver 150 will interrupt the watering schedule of the irrigation controller. Preferably, the receiver 150 provides an interface menu for allowing a user to adjust this irrigation interrupt value (e.g., via menu button 160 and plus/minus buttons 158).

Preferably, the receiver 150 and its interruption mechanism interrupts irrigation based on a moisture measurement performed after a predetermined amount of time since the last irrigation cycle (e.g., between 1-24 hours). In other words, when the receiver 150 and sensor 100 determine that an irrigation event has occurred, it will delay any possible irrigation interruption for a predetermined period of time. This behavior allows the receiver 150 to compare a more accurate soil sensor reading against the predetermined irrigation interruption value. To assist in determining when irrigation has occurred, the receiver 150 monitors for when the maximum soil moisture content has been reached from measurement data transmitted from the sensor 100 (i.e., when the soil has become completely soaked from irrigation). Based on this moisture value, the receiver 150 determines that an irrigation cycle has occurred and then delays irrigation interruption for a predetermined period of time. Preferably, the delay for normal interruption operations is user programmable (e.g., between 1 and 24 hours).

Alternately, the receiver 150 may determine the occurrence of an irrigation event by sensing current passing through the common wire to which it is connected. In this regard, the receiver 150 may use the preset delay to begin comparing current moisture readings after completion of an irrigation schedule, thereby measuring a more accurate and representative moisture reading.

The receiver 150 also includes a user adjustable temperature limit or value that triggers the receiver 150 to interrupt irrigation based on a temperature measurement received from a temperature sensor in the sensor 100 or alternately in the receiver 150.

As previously discussed, the receiver 150 includes a bypass button 162 that, when pressed, halts any irrigation interruption caused by the receiver 150. Once activated, a default bypass duration time is displayed on the display 156 (e.g., 24 hours). The user can adjust this bypass time with the plus/minus buttons 158. After this bypass time has expired, the receiver 150 returns to its normal operating mode in which it can selectively interrupt the irrigation schedule.

Preferably, the receiver 150 may include a plurality of alerts or alarms that activate a flashing light or audible signal on the receiver 150. In one example, an alert will trigger if the current moisture measurement remains below the preset irrigation interruption value for more than a predetermined amount of time (e.g., 3 days). In another example, an alert will trigger if the current moisture measurement falls to a low value, such as about half of the preset irrigation interruption value.

In one embodiment, the receiver 150 can communicate with both a soil moisture sensor 100 and a wireless rain sensor (not shown). The interface of the receiver 150 may include separate displays and settings for the rain sensor so as to allow either the soil sensor 100 or the rain sensor to interrupt irrigation directed by the irrigation controller. Hence, a user only needs a single receiver as opposed to two separate receivers.

While the embodiments of the soil sensing system of the present invention have been generally described as interrupting irrigation when a moisture threshold has been achieved, it should be understood that the soil sensor and receiver can alternately transmit adjustment commands to an irrigation controller to increase or decrease the length of irrigation cycles based on a moisture level of the soil. The receiver may also simply transmit moisture values to a capable irrigation controller, which can then determine if an irrigation schedule should be increased, decreased or interrupted.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A soil moisture system comprising:
    a soil moisture sensor;
    a receiver unit having a wireless transceiver communicating with said soil moisture sensor;
    an irrigation interrupt value stored in said soil moisture system; said irrigation interrupt value displayable and adjustable on a user interface of said soil moisture system as a percentage of a maximum soil moisture content of a region of soil; and,
    an interruption mechanism interrupting irrigation controlled by an irrigation controller; said interruption mechanism interrupting irrigation based on said irrigation interrupt value and a present soil moisture value transmitted from said soil moisture sensor.

2. The soil moisture system of claim 1, further comprising a calibration routine in which said soil moisture sensor periodically measures moisture of said region of soil over a predetermined period of time to determine said maximum soil moisture content.

3. The soil moisture system of claim 1, in which said soil moisture system determines said maximum soil moisture content as a moisture value of said region of soil at about six hours past a peak soil moisture measurement of said region of soil.

4. The soil moisture system of claim 1, wherein said interruption mechanism delays interruption of irrigation until after a predetermined amount of time after a last irrigation cycle.

5. The soil moisture system of claim 4 wherein said soil moisture system determines that an irrigation event has occurred by determining that said maximum soil moisture content of said region of soil has been reached.

6. The soil moisture system of claim 4, wherein said soil moisture system determines that an irrigation event has occurred by sensing current on an irrigation controller's common wire.

7. The soil moisture system of claim 1, wherein said soil moisture system executes an alert on said receiver unit when said present soil moisture value remains below said irrigation interruption value for more than three days.

8. The soil moisture system of claim 1, wherein said soil moisture system executes an alert on said receiver unit when said present soil moisture value drops below about half of said irrigation interruption value.

9. The soil moisture system of claim 1, wherein said soil moisture sensor comprises:
a body having a first surface;
a first and second electrode extending from said first surface; and,
a first and second stake extending from said first surface.

10. The soil moisture system of claim 1, wherein said soil moisture sensor further comprises an indicator light that changes colors based on a wireless signal strength value with said receiver unit.

11. A soil moisture system comprising:
a soil moisture sensor;
a receiver comprising a user interface and a wireless transceiver that communicates with said soil moisture sensor;
an irrigation interrupt value that is user-selectable via said user interface and is stored in said receiver; said irrigation interrupt value being a numerical percentage of a field capacity of a region of soil;
an interruption mechanism located in said receiver and causing interruption of irrigation controlled by an irrigation controller; said interruption mechanism triggering irrigation interruption when a current soil moisture value measured with said soil moisture sensor is higher than said irrigation interrupt value.

12. The soil moisture system of claim 11, wherein said field capacity of a region of soil is a moisture value measured by said soil sensor at about six hours past a peak soil moisture measurement by said soil sensor in said region of soil.

13. The soil moisture system of claim 11, wherein said receiver delays interruption of said irrigation controlled by said interruption mechanism until after a predetermined amount of time after the last irrigation cycle.

14. The soil moisture system of claim 11, wherein said receiver determines that an irrigation event has occurred when said current moisture sensor value is greater than or equal to said field capacity.

15. The soil moisture system of claim 11, wherein said receiver provides an alert when said current moisture sensor value remains below said irrigation interruption value for more than three days.

16. The soil moisture system of claim 11, wherein said soil moisture sensor comprises:
a body having a first surface;
a first electrode and a second electrode that are both fixed perpendicularly from said first surface;
a first stake and a second stake that are both fixed perpendicularly from sayd first surface.

17. The soil moisture system of claim 16, wherein said soil moisture sensor further comprises an antenna located within said body and perpendicular to said first and second electrode.

18. A soil moisture system comprising:
a soil moisture sensor;
a receiver comprising a user interface; a wireless transceiver, and an irrigation controller interface; and,
said receiver interrupting irrigation by said irrigation controller when a current soil moisture value measured by said soil moisture sensor exceeds an irrigation interrupt value;
wherein said irrigation interrupt value is expressed as a percentage of a maximum moisture content level of a region of soil.

19. The soil moisture system of claim 18, wherein said moisture content level of said region of soil is determined by measuring a moisture level of said region of soil after a predetermined amount of time after said soil moisture sensor measure a peak soil moisture level.

20. The soil moisture system of claim 19, wherein said soil moisture system delays interruption of irrigation until a predetermined amount of time after said current moisture value is greater than or equal to said peak soil moisture level.

21. A method of controlling soil moisture, comprising:
displaying an irrigation interrupt value on a soil moisture sensor receiver; said irrigation interrupt value being expressed as a percentage of a maximum moisture content of a region of soil;
receiving periodic soil moisture values wirelessly transmitted from a soil moisture sensor;
interrupting irrigation by an irrigation controller attached to said soil moisture sensor receiver when one of said periodic soil moisture values is greater than or equal to said irrigation interrupt value.

\* \* \* \* \*